United States Patent
Hermann et al.

(10) Patent No.: US 8,216,502 B2
(45) Date of Patent: **\*Jul. 10, 2012**

(54) METHOD FOR THE EXTERNAL APPLICATION OF BATTERY PACK ENCAPSULANT

(75) Inventors: Weston Arthur Hermann, Palo Alto, CA (US); Scott Ira Kohn, Redwood City, CA (US); Noel Jason Mendez, Mountain View, CA (US); Ernest Matthew Villanueva, San Mateo, CA (US); Alexander Thomas Jacobs, Redwood City, CA (US); Peng Zhou, El Cerrito, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 865 days.

This patent is subject to a terminal disclaimer.

(21) Appl. No.: 12/315,303

(22) Filed: Dec. 2, 2008

(65) Prior Publication Data

US 2010/0136413 A1    Jun. 3, 2010

(51) Int. Cl.
*H01M 2/10*   (2006.01)
*B29C 45/14*  (2006.01)

(52) U.S. Cl. ......... 264/272.21; 264/272.11; 264/272.14; 264/272.15; 429/99; 429/100; 429/129; 429/163; 429/177; 429/186; 429/247

(58) Field of Classification Search .................. 429/186, 429/99, 177; 264/272.21, 272.11, 272.14

See application file for complete search history.

(56) References Cited

U.S. PATENT DOCUMENTS

| | | | |
|---|---|---|---|
| 5,288,564 A | 2/1994 | Klein et al. | |
| 5,298,347 A | 3/1994 | Aksoy et al. | |
| 5,736,271 A | 4/1998 | Cisar et al. | |
| 5,907,477 A | 5/1999 | Tuttle et al. | |
| 5,989,300 A | 11/1999 | Eshraghi | |
| 6,103,078 A * | 8/2000 | Hitchens et al. | 204/296 |
| 6,410,185 B1 | 6/2002 | Takahashi et al. | |
| 6,899,975 B2 | 5/2005 | Watanabe et al. | |
| 7,229,712 B2 | 6/2007 | Eshraghi et al. | |
| 7,531,270 B2 * | 5/2009 | Buck et al. | 429/120 |
| 2003/0193103 A1 * | 10/2003 | Barsby | 264/45.9 |
| 2004/0202927 A1 | 10/2004 | Drea et al. | |
| 2007/0048470 A1 * | 3/2007 | Zadesky et al. | 428/35.7 |
| 2007/0218353 A1 * | 9/2007 | Straubel et al. | 429/120 |
| 2009/0023060 A1 | 1/2009 | Villanueva et al. | |

FOREIGN PATENT DOCUMENTS

| | | |
|---|---|---|
| JP | 03190052 A | 8/1991 |
| WO | WO-02/09212 | 1/2002 |
| WO | WO 2009012036 A1 | 1/2009 |

\* cited by examiner

*Primary Examiner* — Yogendra Gupta
*Assistant Examiner* — Jeremiah Smith
(74) *Attorney, Agent, or Firm* — Patent Law Office of David G. Beck

(57) ABSTRACT

A method and apparatus for simplifying battery pack encapsulation is provided. The battery pack includes a pair of complementary housing members with each housing member including a plurality of cell constraints into which the ends of corresponding battery cells are inserted during assembly. One or both housing members also include at least one, and preferably a plurality, of raised encapsulant injection ports. The raised encapsulant injection ports are designed to extend above the surface of the respective housing members and beyond the injected encapsulation material, thus ensuring that the ports remain open after encapsulation material injection.

6 Claims, 4 Drawing Sheets

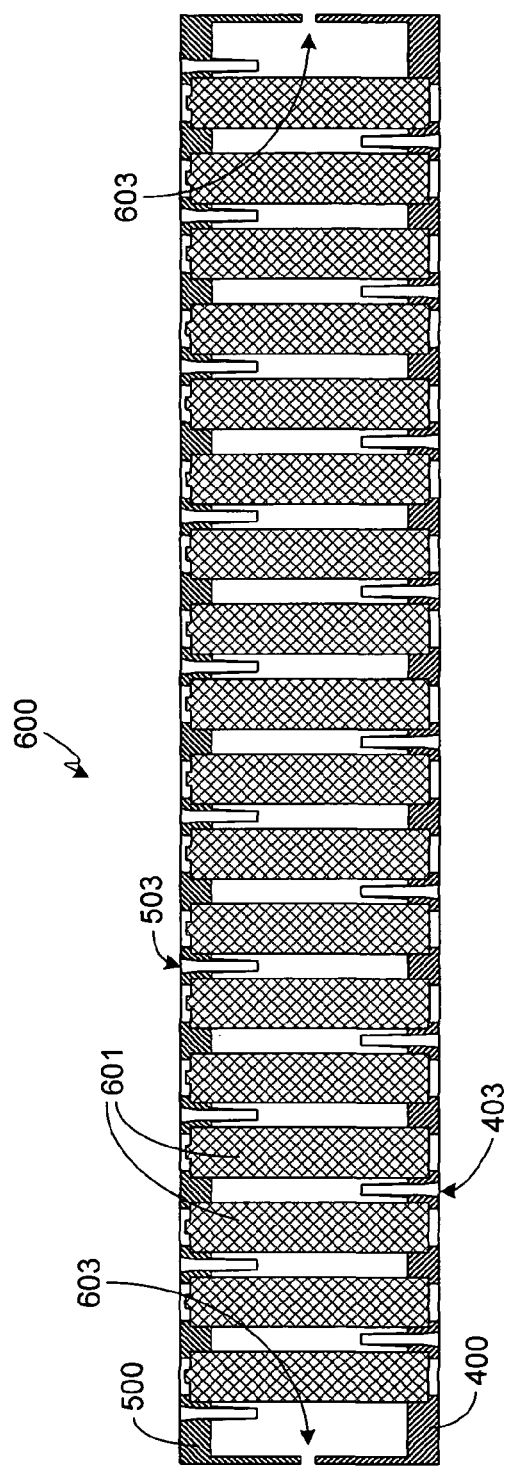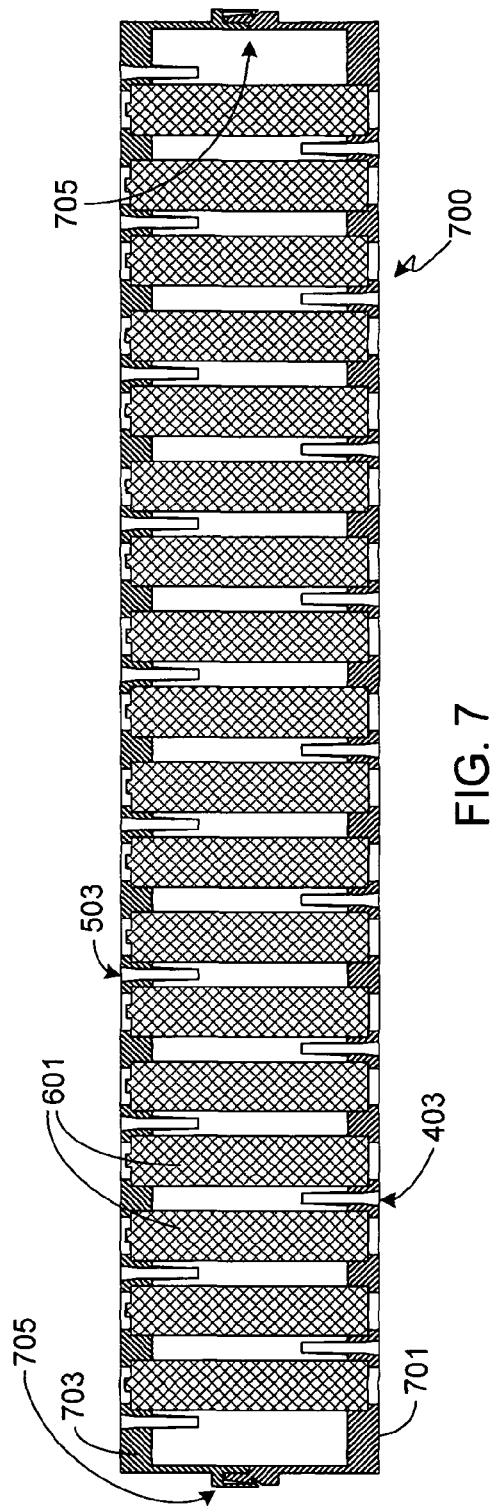

METHOD FOR THE EXTERNAL APPLICATION OF BATTERY PACK ENCAPSULANT

FIELD OF THE INVENTION

The present invention relates generally to battery packs and, more particularly, to a method and apparatus for efficiently encapsulating a plurality of battery cells within a battery module.

BACKGROUND OF THE INVENTION

Battery packs, also referred to as battery modules, have been used for years in a variety of industries and technologies that include everything from portable electric tools and laptop computers to small hand-held electronic devices such as cell phones, MP3 players, and GPS units. In general, a battery pack is comprised of multiple individual batteries, also referred to as cells, contained within a single piece or multi-piece housing. Single piece housings are often comprised of shrink-wrap while multi-piece housings often rely on a pair of complementary housing members that are designed to fit tightly around the cells when the housing members are snapped or otherwise held together. Typically a conventional battery pack will also include means to interconnect the individual cells as well as circuitry to enable charging and/or to protect against overcharging.

Battery packs offer a number of advantages over the use of individual battery cells. From the end user's perspective, combining multiple cells into a single housing simplifies battery removal, replacement and/or battery recharging, since the user is only required to deal with a single unit. From the manufacturer's perspective, the use of battery packs provides additional marketing flexibility. For example, a manufacturer may offer a variety of interchangeable battery packs at different price points for the same device(s), the different battery packs providing different capacities, cell types (e.g., lithium ion versus nickel-metal-hydrid), or other variations. A manufacturer may also find it advantageous to market multiple devices that all utilize a single, interchangeable battery pack.

Recent advances in the development of hybrid and electric vehicles have lead to the need for a new type of battery pack, one capable of housing tens to hundreds of individual cells and surviving the inherent thermal and mechanical stresses of a car for a period of years. Additionally, while the housing used to package a multi-cell vehicle battery must be structurally sound enough to allow battery pack inspection and/or replacement, it must do so with minimal weight since hybrids and electric cars are exceptionally sensitive to excess weight. Lastly, the design of a vehicle battery pack should lend itself to efficient, and preferably automated, manufacturing practices. The present invention provides such a battery pack.

SUMMARY OF THE INVENTION

The present invention provides a simplified encapsulation technique for manufacturing battery packs. In accordance with the invention, the battery pack includes a pair of complementary housing members with each housing member including a plurality of cell constraints into which the ends of corresponding battery cells are inserted during assembly. One or both housing members also include at least one, and preferably a plurality, of raised encapsulant injection ports. The raised encapsulant injection ports are designed to extend above the surface of the encapsulation material, thus ensuring that the ports remain open after injection of the encapsulation material.

In at least one embodiment of the invention, the battery pack is comprised of (i) a first housing member with an interior surface that includes at least one first housing member raised encapsulant injection port and a plurality of cell mounting wells adapted to receive a first end of a plurality of corresponding battery cells; (ii) a second housing member with an interior surface that includes at least one second housing member raised encapsulant injection port and a plurality of cell mounting wells adapted to receive a second end of a plurality of corresponding battery cells; and (iii) a plurality of battery cells. The battery pack further comprises a first layer of encapsulation material surrounding the perimeter of the first end of each battery cell and a second layer of encapsulation material surrounding the perimeter of the second end of each battery cell, wherein an end section of the at least one first housing member raised encapsulant injection port extends beyond the first layer of encapsulation material and an end section of the at least one second housing member raised encapsulant injection port extends beyond the second layer of encapsulation material. The interior edge of each cell mounting well may be chamfered. Each cell mounting well may include at least one through hole. The first and second housing may be secured together by bonding or with at least one latching mechanism. Alternately, upon assembly a gap may exist between the two housing members.

In at least one embodiment of the invention, the battery pack is comprised of (i) a first housing member with an interior surface that includes a plurality of first housing member raised encapsulant injection ports and a plurality of cell constraints adapted to receive a first end of a plurality of corresponding battery cells; (ii) a second housing member with an interior surface that includes a plurality of cell constraints adapted to receive a second end of a plurality of corresponding battery cells; (iii) a plurality of battery cells; and (iv) a first layer of encapsulation material surrounding the perimeter of the first end of each battery cell and a second layer of encapsulation material surrounding the perimeter of the second end of each battery cell, wherein an end section of each of the plurality of first housing member raised encapsulant injection ports extends beyond the first layer of encapsulation material. The second housing member interior surface may further include a plurality of second housing member raised encapsulant injection ports, wherein an end section of each of the plurality of second housing member raised encapsulant injection ports extends beyond the second layer of encapsulation material. The first and second pluralities of cell constraints may be comprised of first and second pluralities of cell mounting wells, respectively, in which case the interior edge of each cell mounting well may be chamfered. The first and second housing may be secured together or, upon assembly, a gap may exist between the two housing members.

In at least one embodiment of the invention, a battery pack manufacturing process is comprised of the steps of (i) inserting the first end of each battery cell into a cell constraint located on a first housing member interior surface; (ii) inserting the second end of each battery cell into a cell constraint located on a second housing member interior surface; (iii) injecting a first quantity of encapsulation material through a plurality of second housing member raised encapsulant injection ports, the first quantity of encapsulation material surrounding the perimeter of the first end of each battery cell and a first section of each of the plurality of first housing member raised encapsulant injection ports while not contacting a second section of each of the plurality of first housing member raised encapsulant injection ports, the second section of each of the plurality of first housing member raised encapsulant injection ports extending further into the interior region of the battery pack assembly than the first section; (iv) rotating the battery pack assembly; and (v) injecting a second quantity of encapsulation material through a plurality of first housing member raised encapsulant injection ports, the second quantity of encapsulation material surrounding the perimeter of the second end of each battery cell and a first section of each of the plurality of second housing member raised encapsulant injection ports while not contacting a second section of each of the plurality of second housing member raised encapsulant injection ports, the second section of each of the plurality of second housing member raised encapsulant injection ports extending further into the interior region of the battery pack assembly than the first section. The cell constraints may be comprised of cell mounting wells. The method may further include the step of coupling the first and second housing members together.

In at least one embodiment of the invention, a battery pack manufacturing process is comprised of the steps of (i) inserting the first end of each battery cell into a cell constraint located on a first housing member interior surface; (ii) adding a first quantity of encapsulation material to the first housing member, the first quantity of encapsulation material surrounding the perimeter of the first end of each battery cell and a first section of each of a plurality of first housing member raised encapsulant injection ports while not contacting a second section of each of the plurality of first housing member raised encapsulant injection ports, the second section of each of the plurality of first housing member raised encapsulant injection ports extending further into the interior region of the battery pack assembly than the first section; (iii) inserting the second end of each battery cell into a cell constraint located on a second housing member interior surface; (iv) rotating the battery pack assembly; and (v) injecting a second quantity of encapsulation material through the plurality of first housing member raised encapsulant injection ports, said second quantity of encapsulation material surrounding the perimeter of the second end of each battery cell. The cell constraints may be comprised of cell mounting wells. The method may further include the step of coupling the first and second housing members together.

A further understanding of the nature and advantages of the present invention may be realized by reference to the remaining portions of the specification and the drawings.

BRIEF DESCRIPTION OF THE DRAWINGS

FIG. 6 is a cross-sectional view of a battery pack assembly in accordance with the invention;

FIG. 7 is a cross-sectional view of an alternate battery pack assembly in accordance with the invention.

DESCRIPTION OF THE SPECIFIC EMBODIMENTS

In the following text, the terms "battery", "cell" and "battery cell" may be used interchangeably and may refer to any of a variety of different cell types and configurations including, but not limited to, lithium ion, lithium ion polymer, nickel metal hydride, nickel cadmium, nickel hydrogen, alkaline, or other battery type/configuration. Similarly, the terms "encapsulant" and "encapsulation material" refer to any of a variety of different single and multi-component resins and adhesives that can be used to fix the battery cells within the battery pack as described in detail below, the encapsulation material being comprised of any of a variety of materials including, but not limited to, silicon based encapsulants, polyurethane based encapsulants, epoxy based encapsulants, and other encapsulation materials. Depending upon the specific design of the intended battery pack, the encapsulant may have any of a variety of characteristics in addition to those required to fix the cells into the battery pack housing members, characteristics such as thermal conductivity, electrical non-conductivity, etc. Additionally, the accompanying figures are only meant to illustrate, not limit, the scope of the invention and should not be considered to be to scale.

Figure 1:
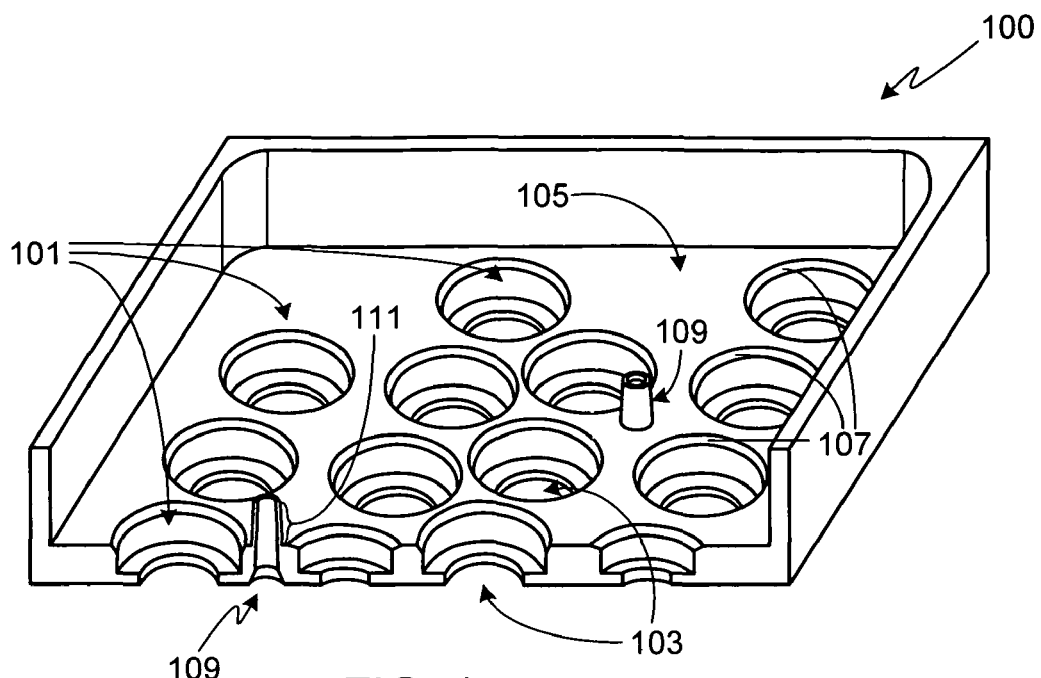
FIG. 1 illustrates a portion of a lower battery pack housing member, this view providing both a perspective view of the member as well as a cross-sectional view of some of the plurality of battery cell mounting wells designed into the battery pack housing member.

FIG. 1 illustrates a portion of a lower battery pack housing member 100, this view providing both a perspective view of member 100 as well as a cross-sectional view of some of the plurality of battery cell mounting wells 101. It will be appreciated that the present invention is not limited to a particular number of cell mounting wells or cells, nor is the invention limited to a particular cell packing density or cell layout.

Preferably each cell mounting well 101 is designed to accommodate a single battery cell, although it will be appreciated that the cell wells can be designed to accommodate sub-groups of battery cells while still taking advantage of the benefits of the present invention. In the preferred embodiment of the invention, each mounting well within either the lower battery pack housing member or the upper battery pack housing member, or both, includes a through hole 103 at the bottom of the well. Through holes 103 provide access to the battery cells after the cells have been mounted within the wells, thus allowing a point of contact for mounting a wiring harness or other electrical contact means. Alternate configurations may include a wiring harness integrated within the housing member, thus eliminating the need for through holes 103.

In the illustrated embodiment, the edge of each mounting well 101 that intersects the inside bottom surface 105 of the housing member is chamfered. Chamfer 107 provides several benefits. First, it can be used to help guide the individual cells into the corresponding mounting wells 101 during the assembly process. Second, for a given level of encapsulation material, chamfer 107 increases the bonding area surrounding each cell, thus potentially leading to improved cell bonding. Third, chamfer 107 helps to wick encapsulant around the perimeter of the cells, thereby improving bonding and allowing the designer to utilize less encapsulant to achieve the desired level of bond strength. It will be appreciated that decreasing the quantity of encapsulant yields both weight and cost savings.

Figure 2:
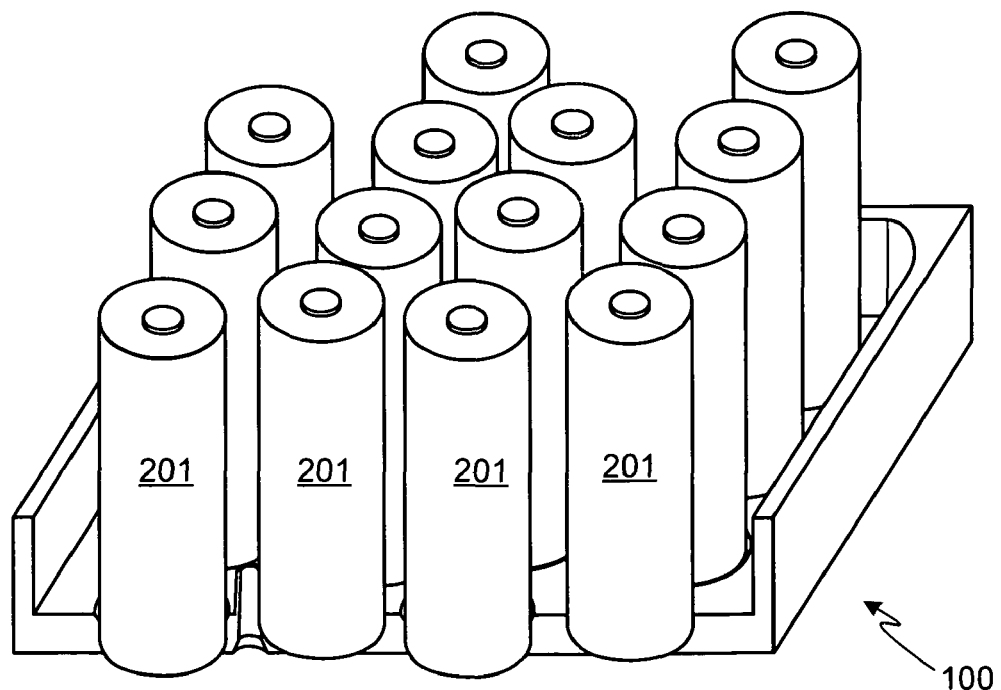
FIG. 2 illustrates the same portion of the lower battery pack housing member shown in FIG. 1, with the addition of battery cells inserted into the cell mounting wells.

FIG. 2 illustrates the same portion of lower battery pack housing member 100 that is shown in FIG. 1. In this figure, however, cells 201 are shown inserted within cell mounting wells 101. As previously noted, although preferably cells 201 are cylindrical as shown, the invention is also suitable for use with non-cylindrical cells, for example rectangularly-shaped cells (not shown). It should also be understood that while the preferred embodiment of the invention utilizes cell wells to hold the cells in place within the housing members during encapsulation, the inventors envision the use of other means to constrain the cells. For example, the cell mounting wells can be replaced by other forms of cell constraints, e.g., posts, ribs, etc., that are located on surface 105 of the housing member and surround a sufficient portion of the cell ends to constrain the cells during the encapsulation process.

Figure 3:
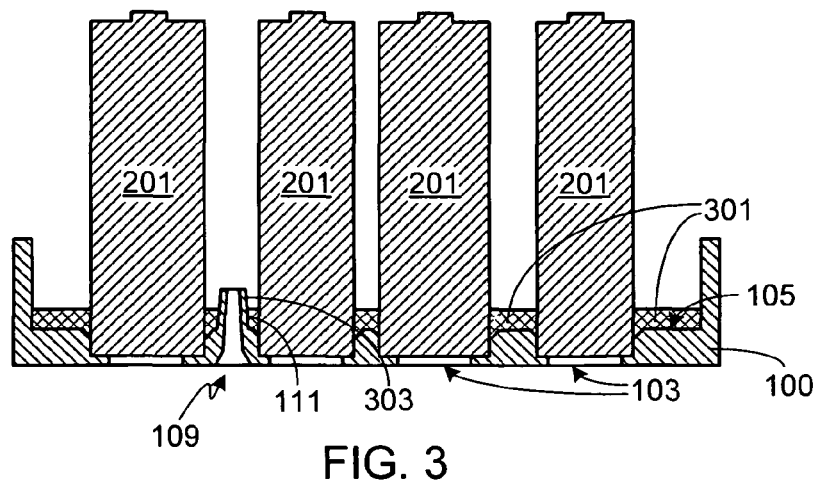
FIG. 3 is a cross-sectional view of the lower battery pack housing member and battery cells shown in FIG. 2, with the addition of a layer of encapsulation material that surrounds the perimeter of the base portion of each cell.

FIG. 3 is a cross-sectional view of lower battery pack housing member 100 and battery cells 201. As shown in this figure, encapsulation material 301 surrounds the perimeter of the base portion of each cell 201. As a result of encapsulant 301, each cell 201 is securely bonded to housing member 100. Although the primary purpose of encapsulation material 301 is to securely bond each cell 201 to the housing member, preferably, and as shown, sufficient encapsulant is added to completely cover the bottom surface 105 of the member, thereby providing a more structurally sound support for cells 201.

FIGS. 1-3 illustrate another aspect of the invention, specifically raised encapsulant injection ports 109. Ports 109 are not simply through holes bored through surface 105 of housing member 100. Rather, each port 109 includes a portion 111 that extends beyond surface 105 to a sufficient height to ensure that raised portion 111 is not completely covered or obstructed by encapsulant 301 during the encapsulation steps, thereby ensuring that port 109 remains open. This aspect of a port 109 is illustrated in FIG. 3, which shows the end section 303 of raised port portion 111 extending above the top surface of encapsulant 301.

It should be understood that although FIG. 1 shows a pair of ports 109 and the view in FIGS. 2 and 3 only show a single port 109, in a typical application of the invention a housing member would include a plurality of ports 109. By including multiple ports 109 the encapsulant only has to flow over a relatively small region of the housing surface and surround only a few cells, thus allowing the selection of a particular encapsulant to be based on a variety of considerations rather than simply emphasizing viscosity. In one embodiment, each housing member includes between 1 and 10 ports 109. In another embodiment, each housing member includes between 10 and 100 ports 109. In yet another embodiment, each housing member includes more than 100 ports 109.

Figure 4:
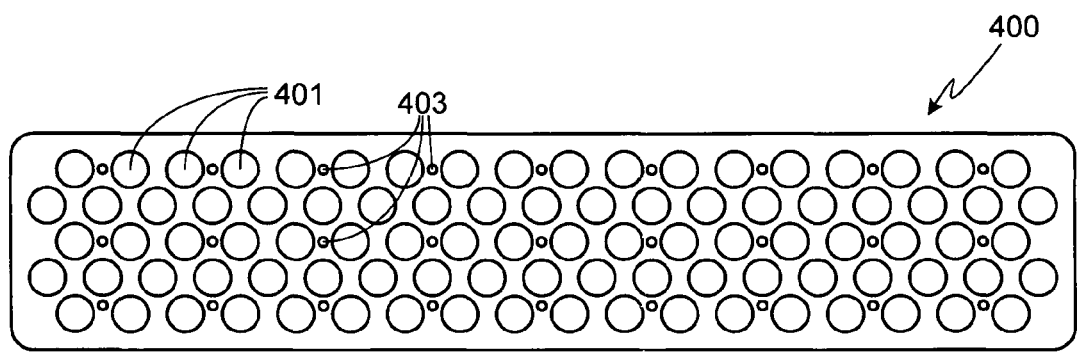
FIG. 4 illustrates a complete housing member.
Figure 5:
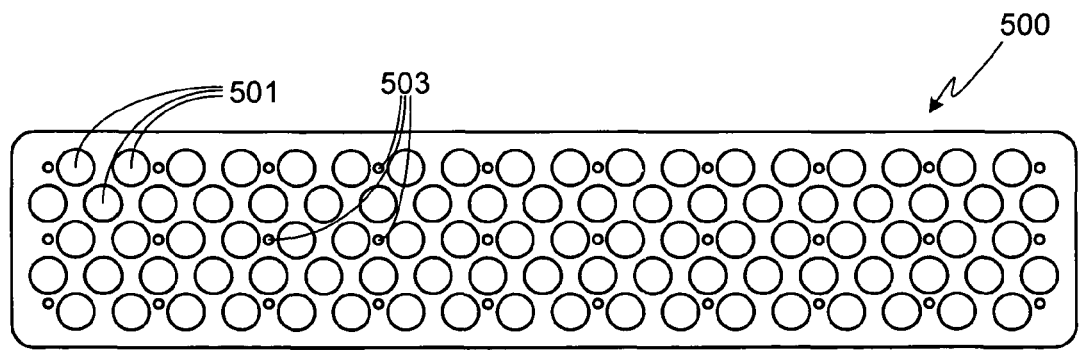
FIG. 5 illustrates a complete housing member that is complementary to the housing member shown in FIG. 4.

FIGS. 4 and 5 illustrate two complementary housing members 400 and 500, respectively. In the illustrated configuration, the final battery pack would house 92 cells, the end portions of the cells being contained within cell wells 401 and 501. Also shown in FIGS. 4 and 5 are raised encapsulant injection ports 403 and 503, respectively. Note that raised ports 403 and 503 are offset from one another to ensure that during encapsulant injection the encapsulant does not pass through both ports. As previously noted, the layout of a battery pack in accordance with the invention can utilize other numbers of cells and ports, as well as other cell/port layouts.

It will be appreciated that the present invention lends itself to both manual and automated battery pack manufacturing processes. For example, in one preferred process all of the battery cells are inserted into the corresponding cell wells within the first housing member, for example a housing member 400 such as that illustrated in FIG. 4. Once the cells are properly seated within the cell mounting wells of the housing member, a complementary housing member (e.g., member 500) is positioned over the cells such that the second end of each cell is inserted within the corresponding cell wells of the complementary housing member. FIG. 6 is a cross-sectional view of such a battery pack 600. As shown, cells 601 are positioned within the cell wells of the lower and upper housing members as described above. Also as described above, raised encapsulant fill ports 403 and 503 are offset from one another.

In battery pack 600 shown in FIG. 6, after battery pack assembly there remains a gap 603 between housing members 400 and 500. As a result of this configuration, cells 601 are the primary source of battery pack structural integrity. It should be understood that other configurations can also be used with the invention. For example, battery pack 700, shown in cross-section in FIG. 7, is similar to that shown in FIG. 6 except that lower housing member 701 is in contact with upper housing member 703. In this configuration, one or more latching mechanisms 705 are used to secure the two members together, although it will be appreciated that once encapsulant has been added to the structure, latches 705 add little structural rigidity to that achieved via the cells. In addition to using any of a variety of different latching mechanisms, other means can be used to secure the two housing members together. For example, the mating surfaces of the housing members can be ultrasonically welded together, or bonded together with a suitable adhesive.

Once a battery pack such as battery pack 700 or 800 is assembled, encapsulant is added. Although encapsulant can be added manually, preferably the encapsulant is added through an automated system. For example, a mounting jig can be used to hold the assembly in place and an automated system with multiple injection needles, corresponding to the port configuration, can be used to introduce the encapsulant into the battery pack.

Figure 8:
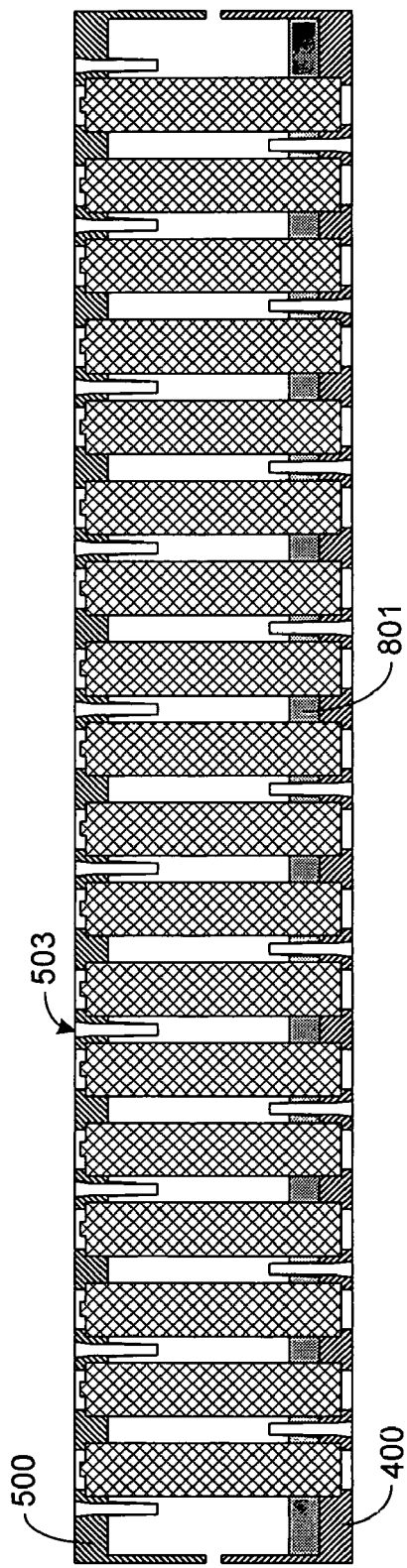
FIG. 8 is a cross-sectional view of the battery pack shown in FIG. 6 after injection of the first layer of encapsulation material.
Figure 9:
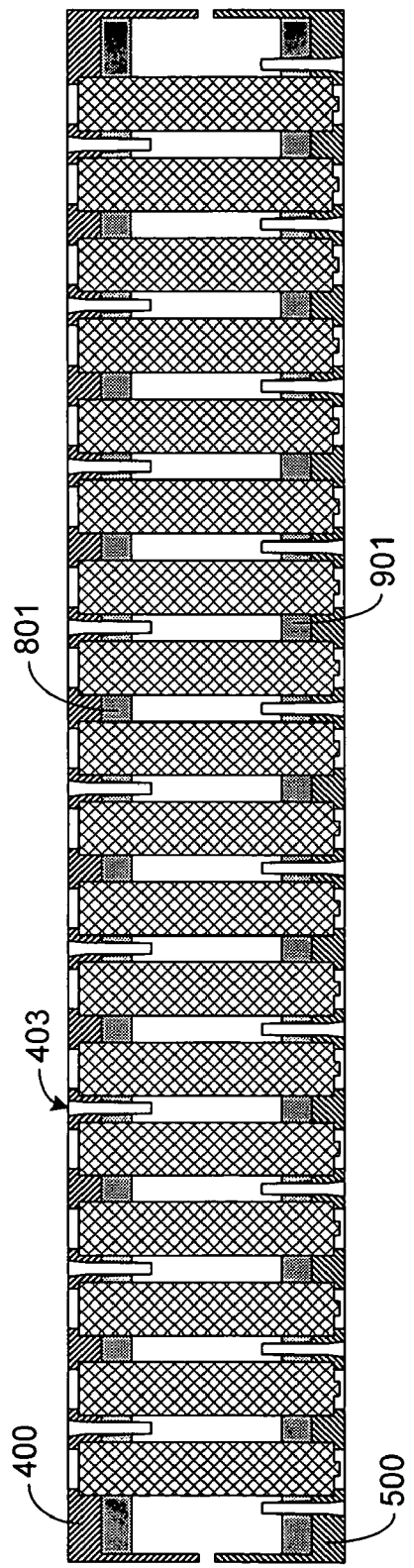
FIG. 9 is a cross-sectional view of the battery pack shown in FIG. 8 after the assembly has been rotated and the second layer of encapsulation material has been injected into the assembly.

FIG. 8 is a cross-sectional view of battery pack 700 after encapsulant 801 has been injected into the assembly through encapsulant fill ports 503. Preferably encapsulation material 801 is simultaneously introduced through all ports 503. Alternately, the encapsulation material can be injected serially through the ports. The encapsulant then flows throughout the bottom surface of member 400, surrounding the end portion of each cell 601 so that all cells 601 are held in place. After encapsulant 801 has sufficiently hardened within housing member 400, the battery pack is flipped over as shown in FIG. 9 and encapsulation material 901 is added through encapsulant injection ports 403. If the pattern of encapsulant injection ports is the same for both housing members, then, as preferred, the same injection manifold can be used to add encapsulant to both housing members. After both housing members have been attached to the cells via the two encapsulation layers and both layers of encapsulant have sufficiently cured, the battery pack is ready for wiring, testing and use.

In the preferred manufacturing process, and as described above, the battery pack is assembled prior to adding encapsulation material to either housing member. In an alternate manufacturing process, the cells are positioned into the lower housing member and encapsulation material is added thereby fixing the cells into place before the upper housing member is fit over the second end of the cells. Once the upper housing member is in position and the cells are properly inserted into the upper housing member cell wells, the assembly can be flipped over and encapsulant added to fix the cells to the second housing member. A disadvantage of this approach, however, is that a cell may be out of alignment when it is bonded to the lower housing member, thereby preventing a straightforward integration of the cells into the upper housing member. Of course this problem can be avoided through the use of accurate mounting jigs. It will be appreciated that if the alternate manufacturing process is used, raised encapsulation ports are only required on one of the housing members, i.e., the lower housing member, as the first injection of encapsulant is performed without the upper housing member being in place.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of manufacturing a battery pack, the method comprising the steps of:
    inserting a first end of each of a plurality of battery cells into a corresponding cell constraint of a first plurality of cell constraints located on an interior surface of a first housing member;
    inserting a second end of each of said plurality of battery cells into a corresponding cell constraint of a second plurality of cell constraints located on an interior surface of a second housing member, wherein said first housing member, said second housing member and said plurality of battery cells comprise a battery pack assembly;
    injecting a first quantity of encapsulation material through a first plurality of raised encapsulant injection ports within said interior surface of said second housing member, wherein said first quantity of encapsulation material surrounds said first end of each of said plurality of battery cells, wherein said first quantity of encapsulation material surrounds a first section of a second plurality of raised encapsulant injection ports within said interior surface of said first housing member, and wherein said first quantity of encapsulation materials does not contact a second section of said second plurality of raised encapsulant injection ports within said interior surface of said first housing member, wherein said second section of said second plurality of raised encapsulant injection ports extends further from said interior surface of said first housing member than does said first section of said second plurality of raised encapsulant injection ports;
    rotating said battery pack assembly; and
    injecting a second quantity of encapsulation material through said second plurality of raised encapsulant injection ports within said interior surface of said first housing member, wherein said second quantity of encapsulation material surrounds said second end of each of said plurality of battery cells, wherein said second quantity of encapsulation material surrounds a first section of said first plurality of raised encapsulant injection ports within said interior surface of said second housing member, and wherein said second quantity of encapsulation materials does not contact a second section of said first plurality of raised encapsulant injection ports within said interior surface of said second housing member, wherein said second section of said first plurality of raised encapsulant injection ports extends further from said interior surface of said second housing member than does said first section of said first plurality of raised encapsulant injection ports.

2. The method of claim 1, wherein said first plurality of cell constraints is comprised of a first plurality of cell mounting wells, and wherein said second plurality of cell constraints is comprised of a second plurality of cell mounting wells.

3. The method of claim 1, further comprising the step of coupling said first housing member to said second housing member prior to said step of injecting said first quantity of encapsulation material.

4. A method of manufacturing a battery pack, the method comprising the steps of:
    inserting a first end of each of a plurality of battery cells into a first plurality of cell constraints located on an interior surface of a first housing member;
    adding a first quantity of encapsulation material into said first housing member, wherein said first quantity of encapsulation material covers said interior surface of said first housing member and surrounds said first end of each of said plurality of battery cells, wherein said first quantity of encapsulation material surrounds a first section of a plurality of raised encapsulant injection ports within said interior surface of said first housing member, and wherein said first quantity of encapsulation materials does not contact a second section of said plurality of raised encapsulant injection ports within said interior surface of said first housing member, wherein said second section of said plurality of raised encapsulant injection ports extends further from said interior surface of said first housing member than does said first section of said plurality of raised encapsulant injection ports;
    inserting a second end of each of said plurality of battery cells into a second plurality of cell constraints located on an interior surface of a second housing member, wherein said first housing member, said second housing member and said plurality of battery cells comprise a battery pack assembly;
    rotating said battery pack assembly; and
    injecting a second quantity of encapsulation material through said plurality of raised encapsulant injection ports within said interior surface of said first housing member, wherein said second quantity of encapsulation material surrounds said second end of each of said plurality of battery cells.

5. The method of claim 4, wherein said first plurality of cell constraints is comprised of a first plurality of cell mounting wells, and wherein said second plurality of cell constraints is comprised of a second plurality of cell mounting wells.

6. The method of claim 4, further comprising the step of coupling said first housing member to said second housing member prior to said rotating step.

* * * * *